UNITED STATES PATENT OFFICE.

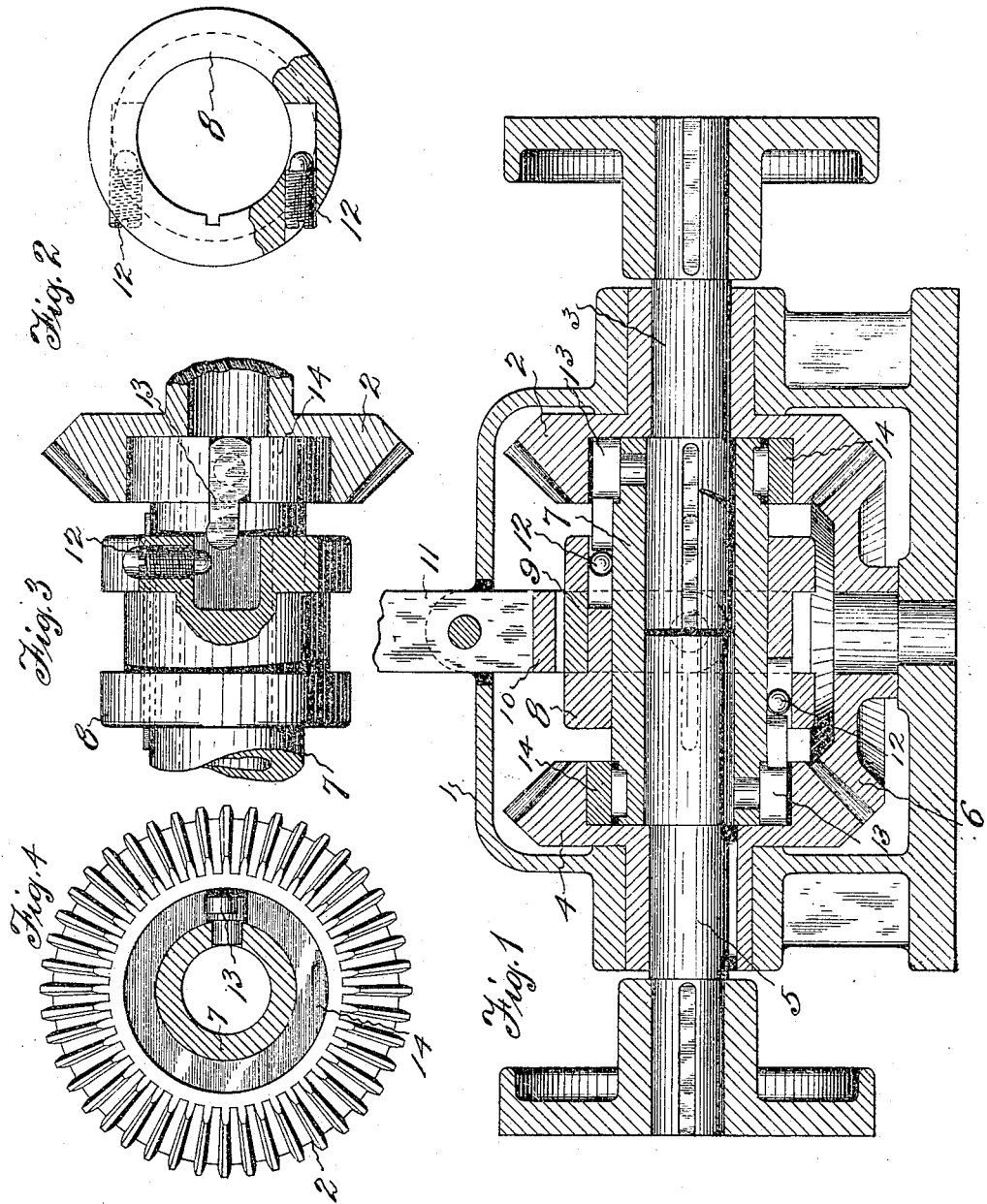

CHARLES W. SPONSEL, OF HARTFORD, CONNECTICUT, ASSIGNOR TO WILLIAM H. BRODIE COMPANY, OF NEW YORK, N. Y., A CORPORATION OF NEW YORK.

DRIVING MECHANISM.

No. 808,120.      Specification of Letters Patent.      Patented Dec. 26, 1905.

Application filed May 25, 1903. Serial No. 158,592.

*To all whom it may concern:*

Be it known that I, CHARLES W. SPONSEL, residing in Hartford, in the State of Connecticut, have invented new and useful Improvements in Driving Mechanism, of which the following is a specification, reference being had to the accompanying drawings to aid in understanding the invention as embodied in the structure herein illustrated.

The invention relates to mechanisms for changing the direction of rotation of a driven shaft without stopping or changing the direction of rotation of the driving-shaft and to means for locking a driving part to a driven part.

The illustrations show an embodiment of my invention as employed as a reversing mechanism, and when so employed the parts are, by preference, mounted in a case preferably closed, in which a gear is loosely mounted upon the driving-shaft, a gear is fixed to the driven shaft, and an intermediate gear is arranged meshing with both the loose and the fixed gears. A sleeve is arranged between the loose and fixed gears and is keyed to the end portion of the driving-shaft and runs loose on the end portion of the driven shaft. A collar is mounted on the sleeve, and a spline prevents rotation of the collar on the sleeve, while permitting sliding movement thereon. Two members, preferably adjustable, are mounted in the collar, and these members are adapted to engage lever-like members mounted on the sleeve and having a portion extending between the ends of expansible or split rings, the latter being supported upon or carried by the sleeve. The split rings are located one within the recess in the face of each gear, mounted on said driving and driven shafts, respectively.

Figure 1 of the accompanying drawings is a central longitudinal sectional view of the mechanism. Fig. 2 is an end or face view of the collar. Fig. 3 is a side view of the collar with one of the engaging members mounted therein, showing also one lever-like member and an expansible ring arranged in the recess in a gear; and Fig. 4 is a sectional view of the sleeve with one lever-like member and the face of a gear and its expansible ring.

The case 1 inclosing this mechanism may be made of any suitable material in any desired shape. The hub of the beveled gear 2, mounted to revolve upon the driving-shaft 3, is mounted in bearings at one end of the case, and the hub of the beveled gear 4, fixed to the driven shaft 5, is mounted in bearings at the opposite end of the case. The intermediate beveled gear 6, meshing with the other gears, is preferably mounted upon a stud projecting upwardly from the bottom of the case. The opposing faces of the shaft-gears are recessed, and a sleeve 7 extends over the ends of both the driving and driven shafts, preferably extending to the bottom of the wheel-recesses. This sleeve is keyed or otherwise secured to the end portion of the driving-shaft and is loose upon the end portion of the driven shaft.

The collar 8 is splined or otherwise secured against rotation on the sleeve. The collar is provided with an annular channel to receive the yoke 9, the latter being connected to a fork 10, which forms a part of or is operatively connected to a lever 11. The lever is pivotally mounted, by preference, to the case.

A split ring is, as before stated, located within a recess in the face of each one of the gears 2 and 4, and a lever or cam like member 13 is arranged between the end portions of the split ring, so that when said member 13 is moved to the right or left from its normal position it causes the end portions of the split ring to separate, thus expanding the split ring and forcing its periphery against the wall of the recess in the wheel or gear and locking the wheel or gear and split ring together. To move the member 13 from its normal position, or, in other words, the position occupied by it while the split ring is not opened or expanded, I provide an abutment or part on or in the collar, and to make this adjustable I prefer to employ a screw, the end portion of which is adapted to engage and move the member 13. The collar is preferably recessed, as shown, and the screw arranged to enter said recess. I prefer that the members 13 be pivotally mounted and that the pivot of each member 13 be located midway in the opening between the ends of the expansible ring and the portion of each member that is engaged by the ends of the ring be flattened, so that when the member 13 is moved one corner portion of the flat portion will force one end of the ring in one direction, and the diagonally opposite corner portion of the flat portion will force the other end of the ring in the opposite direction.

When the collar is in the intermediate position, as illustrated in the drawings, the rotation of the driving-shaft simply causes a rotation of the sleeve and collar without causing the rotation of any of the gears or of the driven shaft. If the collar be moved along the sleeve toward the gear fixed to the driven shaft, the member 12 will engage the expanding member 13, thus causing the expansion of the ring against the wall of the recess in this wheel or gear, so that the fixed gear will be frictionally locked to the split ring, and as the ring is restrained from rotation on the sleeve the gear or wheel will be locked to the sleeve. With the parts in these positions the driven shaft will, by means of the sleeve, the ring, and fixed gear, be driven in the same direction as the driving-shaft. If now the collar be moved toward the gear or wheel that is loose on the driving-shaft the member 12 will engage the expanding member adjacent to that gear and cause the expansion of that ring, so as to secure the sleeve to the loose gear. This gear will then rotate with the sleeve and driving-shaft, and through the intermediate gear and fixed gear will rotate the driven shaft in the reverse direction.

It will be seen that all of the parts of this mechanism are simple to construct and easy to assemble, the screws may be quickly adjusted, so as to obtain the exact necessary movement of the expanding members borne by the sleeve, and that these members are so located and shaped that the rings will be expanded powerfully in both directions against the walls of the recesses in which they are located. The members 12 can be easily adjusted without taking the mechanism apart, and they are arranged on diametrically opposite sides of the opposite ends of the collar, so the weight will be balanced. The expanding members are preferably carried by the sleeve and so shaped that they will exert an equal force upon the opposite ends of the rings and expand them equally in opposite directions and obtain a uniform pressure against the interior walls of their respective recesses.

This mechanism when employed as a reversing-gear is particularly adapted for marine engines, although it may be used for other purposes. As will readily be seen, a marine engine connected with a shaft provided with this reversing mechanism may be driven ahead continuously and the screw held stationary or may be driven forwardly or backwardly, as desired, by movement of the operating-lever. When the driven shaft is not being rotated, all of the gears remain stationary.

It will be readily seen that the clutch parts of the mechanism may be employed independently of the other parts, in which event the recessed wheel mounted to rotate loosely on a shaft may be locked to the shaft, so that the wheel may drive the shaft when locked thereto and run loosely thereon when not locked, or the shaft may run loosely in the wheel and the wheel locked thereto and be driven thereby, and so power be transmitted as desired, it being simply necessary when so employing this part of my invention to discard so much of the reversing mechanism as is not required.

Having therefore described my invention, what I claim as new is—

1. A driving mechanism comprising a driving and a driven shaft, a gear adapted to run loose on the driving-shaft, a gear fixed to the driven shaft, a gear meshing with both shaft-gears, a non-reciprocating sleeve extending between the shaft-gears and fixed to the driving-shaft and running loose on the driven shaft, a collar adapted to slide on the sleeve but not to rotate independently thereof, a vibratory expanding member mounted at each end portion of the sleeve and adapted to be moved by the collar, an expansible ring mounted upon each end of the sleeve within a recess in a gear and having its ends engaging the end portion of one of said expanding members, and means for moving the collar into engagement with either expanding member and out of engagement with both expanding members.

2. A driving mechanism comprising a driving and a driven shaft, a gear adapted to run loose on the driving-shaft, a gear adapted to be keyed to the driven shaft, a gear meshing with both shaft-gears, a non-reciprocating sleeve extending between the shaft-gears and adapted to be keyed to the driving-shaft and to run loose on the driven shaft, a collar splined on the sleeve, wedge-screws mounted in opposite end portions of the collar, a vibratory expanding-lever mounted on each end portion of the sleeve and having an end adjacent to a wedge-screw, an expansible ring mounted upon each end portion of the sleeve within a recess in a gear and having its ends contiguous to a portion of one of said expanding-levers, and means for moving the collar and causing the wedge-screws to engage either of the expanding-levers.

3. In a driving mechanism, a driving and a driven shaft, reversed gears mounted thereon, a non-reciprocating sleeve mounted on the end portions of the shafts, a vibratory expanding member mounted at each end portion of said sleeve, a collar splined on the sleeve and adapted to operate either expanding-lever, and an expansible ring at each end of the sleeve with the ends of each expansible ring being adjacent to an expanding member, said rings adapted to be expanded against the wall of the recess of its gear.

4. In a driving mechanism, a driving and a driven shaft, gears mounted on said shafts, a non-reciprocating sleeve fixed to one shaft and running loose on the other shaft, an expansible ring mounted upon the sleeve within one of said gears, and a vibratory expanding member mounted upon the sleeve and having two opposite faces in engagement with the opposite ends of the expansible ring, means for operating the expanding member and causing the opposite faces of the expanding member to exert pressure oppositely upon the opposing faces of the expanding ring, and a gear meshing with the shaft-gears.

CHARLES W. SPONSEL.

Witnesses:
HARRY R. WILLIAMS,
ETHEL M. LOWE.